(12) United States Patent
Fries et al.

(10) Patent No.: US 8,819,660 B2
(45) Date of Patent: Aug. 26, 2014

(54) VIRTUAL MACHINE BLOCK SUBSTITUTION

(75) Inventors: Robert Fries, Kirkland, WA (US);
Srivatsan Parthasarathy, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 525 days.

(21) Appl. No.: 13/171,443

(22) Filed: Jun. 29, 2011

(65) Prior Publication Data
US 2013/0007733 A1    Jan. 3, 2013

(51) Int. Cl.
*G06F 9/45*    (2006.01)

(52) U.S. Cl.
USPC .......................... 717/168; 717/169; 717/171

(58) Field of Classification Search
None
See application file for complete search history.

(56) References Cited

U.S. PATENT DOCUMENTS

| | | | | |
|---|---|---|---|---|
| 5,987,477 A * | 11/1999 | Schmuck et al. | | 1/1 |
| 6,634,025 B1 * | 10/2003 | Hauptmann et al. | | 717/168 |
| 6,915,513 B2 * | 7/2005 | Duesterwald et al. | | 717/168 |
| 7,000,229 B2 * | 2/2006 | Gere | | 717/169 |
| 7,168,062 B1 * | 1/2007 | Schmitter | | 717/110 |
| 7,451,443 B2 | 11/2008 | Lowell | | |
| 7,533,377 B2 * | 5/2009 | Appavoo et al. | | 717/168 |
| 7,565,519 B1 * | 7/2009 | Kumar et al. | | 713/1 |
| 7,627,866 B2 | 12/2009 | Bunker | | |
| 7,784,044 B2 | 8/2010 | Buban | | |
| 7,818,736 B2 * | 10/2010 | Appavoo et al. | | 717/168 |
| 7,890,946 B2 * | 2/2011 | Blumfield et al. | | 717/171 |
| 8,104,031 B2 * | 1/2012 | Kai | | 717/169 |
| 8,117,434 B2 * | 2/2012 | Sun et al. | | 717/171 |
| 8,146,073 B2 * | 3/2012 | Sinha | | 717/170 |
| 8,166,470 B2 * | 4/2012 | Ellison | | 717/169 |
| 8,205,194 B2 * | 6/2012 | Fries et al. | | 717/168 |
| 8,245,223 B2 * | 8/2012 | Bhatia et al. | | 717/174 |
| 8,261,247 B2 * | 9/2012 | Arnold | | 717/169 |
| 8,266,576 B2 * | 9/2012 | Lam et al. | | 717/100 |
| 8,316,120 B2 * | 11/2012 | Gouge et al. | | 717/168 |
| 8,336,044 B2 * | 12/2012 | Wang et al. | | 717/174 |
| 8,387,037 B2 * | 2/2013 | Henseler et al. | | 717/168 |
| 8,464,241 B2 * | 6/2013 | Hayton | | 717/170 |
| 8,468,516 B1 * | 6/2013 | Chen et al. | | 717/171 |

(Continued)

OTHER PUBLICATIONS

Miedes, Dunoz-Escoi, "Dynamic Software Update"; 2012, technical Report ITI_SIDI-2012/004 of Universitat Politecnica de Valencia; [retrieved on Nov. 26, 2013]; Retrieved from Internet <URL:http://web.iti.upv.es/~fmunyoz/research/pdf/TR-ITI-SIDI-2012004.pdf>;pp. 1-28.*

(Continued)

*Primary Examiner* — Xi D Chen
(74) *Attorney, Agent, or Firm* — Jim Sfekas; Kate Drakos; Micky Minhas

(57) ABSTRACT

Techniques are described to allow substation of blocks into a virtual machine image of an executing virtual machine. A patch may be applied to a first virtual machine image. One or more blocks modified by the patch are identified and copied to a host having a virtual machine executing from a virtual machine image that is based on the first virtual machine image (prior to the patch). While the virtual machine is executing, the substitution blocks are applied (supersede) corresponding original blocks in the virtual machine image. A guest operating system in the virtual machine may either begin using an executable file in a substitution block. In addition, the guest operating system may be forced to flush from memory and cache executable code replaced by the substitution block.

20 Claims, 6 Drawing Sheets

(56) References Cited

U.S. PATENT DOCUMENTS

| | | | |
|---|---|---|---|
| 8,505,003 B2* | 8/2013 | Bowen | 717/168 |
| 8,539,468 B2* | 9/2013 | Popov et al. | 717/162 |
| 8,561,050 B2* | 10/2013 | Periyasamy | 717/168 |
| 8,656,386 B1* | 2/2014 | Baimetov et al. | 717/171 |
| 2004/0015944 A1* | 1/2004 | Briggs | 717/168 |
| 2004/0255286 A1* | 12/2004 | Rothman et al. | 717/168 |
| 2006/0184937 A1 | 8/2006 | Abels | |
| 2007/0061372 A1* | 3/2007 | Appavoo et al. | 707/200 |
| 2008/0163194 A1* | 7/2008 | Dias et al. | 717/168 |
| 2008/0243840 A1* | 10/2008 | Bhandari | 707/6 |
| 2009/0007105 A1* | 1/2009 | Fries et al. | 718/1 |
| 2009/0249324 A1 | 10/2009 | Brar | |
| 2010/0058335 A1* | 3/2010 | Weber | 718/1 |
| 2010/0180272 A1* | 7/2010 | Kettler et al. | 717/171 |
| 2010/0250869 A1* | 9/2010 | Adams et al. | 711/154 |
| 2011/0271270 A1* | 11/2011 | Bowen | 717/171 |
| 2011/0302569 A1* | 12/2011 | Kunze et al. | 717/169 |
| 2012/0117555 A1* | 5/2012 | Banerjee et al. | 717/168 |

OTHER PUBLICATIONS

Hicks, "Dynamic Software Updating"; 2001, Dissertation, University of Pennsylvania; [retrieved on Nov. 26, 2013]; Retrieved from Internet <URL :http://www.win.tue.nl/~hmei/SoftwareUpdate/DynamicSoftwareUpdating PhDThesis.pdf>;pp. 1-221.*

Ruth, et al., "Autonomic Live Adaptation of Virtual Computational Environments in a Multi-Domain Infrastructure"; 2006 IEEE; [retrieved on Nov. 25, 2013]; Retrieved from Internet<URL: http://ieeexplore.ieee.org/stamp/stamp.jsp?Ip=&arnumber=1662376>;pp. 5-14.*

Reich, et al., "VMTorrrent: Scalabale P2P Virtual machine Streaming"; 2012 ACM; [retrieved on Feb. 18, 2014]; Retrieved from Internet <URL:http://dl.acm.org/citation.cfm?id=2413176>;pp. 289-300.*

Al-Kiswany, et al., "VMFlock: Virtual Machine Co-Migration for the Cloud"; 2011 ACM; [retrieved on Feb. 18, 2014]; Retrieved from Internet <URL:http://dl.acm.org/citation.cfm?id=1996130>;pp. 159-170.*

Chen, et al., "An Efficient Resource Management System for On-line Virtual Cluster Provision"; 2009 IEEE; [retrieved on 2-18-2014]; Retrieved from Internet <URL:http://ieeexplore.ieee.org/stamp/stamp.jsp?tp=&arnumber=5284146>;pp72-79.*

Huang, et al., "Minimizing Latency in Fetching Virtual Machine Images Based on Multi-Point Collaborative Approach"; 2013 IEEE; [retrieved on Feb. 18, 2014]; Retrieved from Internet <URL:http://ieeexplore.ieee.org/stamp/stamp.jsp?tp=&arnumber=6682076>;pp. 262-267.*

Devirtualizable Virtual Machines Enabling General, Single-Node, Online Maintenance Date Published Oct. 13, 2004.

VMware vSphere 4 Features and Benefits Compared Date Published Dec. 6, 2010.

* cited by examiner

VIRTUAL MACHINE BLOCK SUBSTITUTION

BACKGROUND

Data centers, compute clouds, and other networks of cooperating hosts often use virtual machines (VMs) for management and efficiency benefits. In some cases, a virtual machine image such as a "golden image" may be duplicated and used in multiple virtual machines. That is, a root or base virtual machine image may exist at a management server, and virtual machines on hosts may be running copies of the base virtual machine image.

At times, it may be desirable to update or patch the software such as applications and operating systems on virtual machines. Often, the same patch must be applied to all of the virtual machines that are based on a same virtual machine image. That is, virtual machines using copies of a base virtual machine image may need a same patch or update. Typically, this has involved, for running virtual machines, copying a patch, installing the patch, and restarting the virtual machine and its guest operating system. However, restarting a virtual machine may present problems. Particularly in environments of distributed or highly interconnected applications, or with applications that require minimal downtime, restarting may disrupt a service or affect a Service Level Agreement. Even in cases where there is only virtual machine to be updated, it may nonetheless be inconvenient to restart that virtual machine.

Techniques related to updating virtual machine images of live virtual machines are discussed below.

SUMMARY

The following summary is included only to introduce some concepts discussed in the Detailed Description below. This summary is not comprehensive and is not intended to delineate the scope of the claimed subject matter, which is set forth by the claims presented at the end.

Techniques are described to allow substation of blocks into a virtual machine image of an executing virtual machine. A patch may be applied to a first virtual machine image. One or more blocks modified by the patch are identified and copied to a host having a virtual machine executing from a virtual machine image that is based on the first virtual machine image (prior to the patch). While the virtual machine is executing, the substitution blocks are applied (supersede) corresponding original blocks in the virtual machine image. A guest operating system in the virtual machine may either begin using an executable file in a substitution block. In addition, the guest operating system may be forced to flush from memory and cache executable code replaced by the substitution block.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Virtualization Overview

Figure 1:
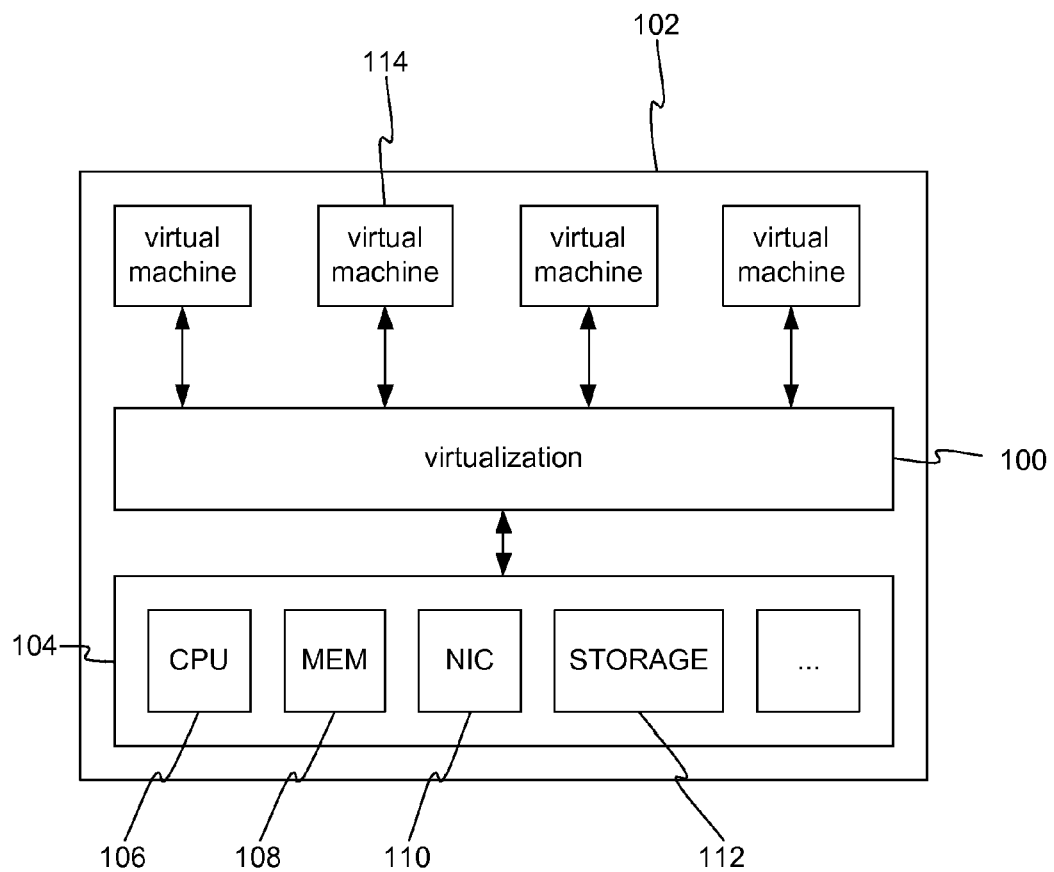
FIG. 1 shows an example virtualization layer.

FIG. 1 shows an example virtualization layer 100. A computer 102 has hardware 104, including a central processing unit (CPU) 106, memory 108, a network interface 110, non-volatile storage 112, and other components not shown, such as a bus, a display adapter, etc. The virtualization layer 100 manages and facilitates execution of virtual machines 114. Although not shown in FIG. 1, each virtual machine 114 typically has an associated virtual disk image and a guest operating system. For brevity, the operating system and perhaps application software of a virtual machine 114 will sometimes be referred to as a guest, which is stored and executed from the virtual disk image associated with the virtual machine 114.

The virtualization layer 100 may be of any variety of known or future implementations, such as Hyper-V Server™, VMWare ESX Server™, Xen, Oracle VM™, etc. The architecture of the virtualization layer may a hosted type, with a virtual machine monitor (VMM) running on a host operating system, or a bare-metal type with a hypervisor or the like running directly on the hardware 104 of the computer 102. As used herein, the term "virtual machine" refers to a system-type virtual machine that simulates any specific hardware architecture (e.g., x86) able to run native code for that hardware architecture; to the guest, the virtual machine may be nearly indistinguishable from a hardware machine. Virtual machines discussed herein are not abstract or process-type virtual machines such as Java Virtual Machines.

The virtualization layer 100 performs the basic function of managing the virtual machines 114 and sharing of the hardware 104 by both itself and the virtual machines 114. Any of a variety of techniques may be used to isolate the virtual machines 114 from the hardware 104. In one embodiment, the virtualization layer may provide different isolated environments (i.e., partitions or domains) which correspond to virtual machines 114. Some of the virtualization layer 100 such as shared virtual device drivers, inter virtual machine communication facilities, and virtual machine management APIs (application programming interfaces), may run in a special privileged partition or domain, allowing for a compact and efficient hypervisor. In other embodiments, functionality for virtual machine management and coherent sharing of the hardware 104 may reside in a monolithic on-the-metal hypervisor.

Figure 2:
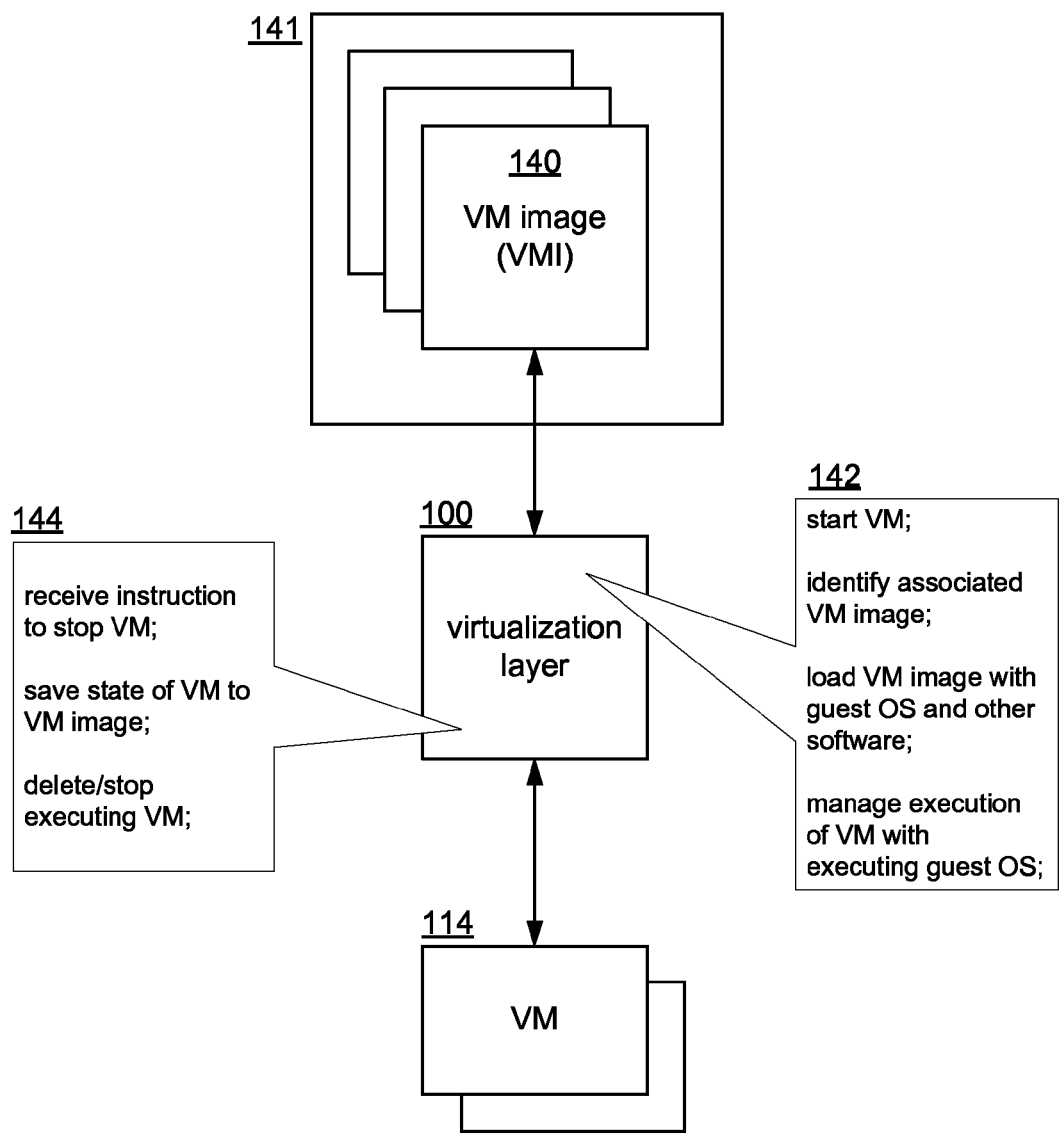
FIG. 2 shows processes and interactions of virtualization layer in relation to virtual machines and virtual machine images.

FIG. 2 shows processes and interactions of virtualization layer 100 in relation to virtual machines 114 and virtual machine images 140. The virtualization layer 100 performs a process 142 of starting and executing a virtual machine 114, possibly according to corresponding virtual machine configuration parameters. When a virtual machine 114 (VM) is started, the virtualization layer identifies an associated virtual machine image 140. In practice, any virtual machine image 140 can be used by any virtual machine 114. The virtual machine image 140 may be a specially formatted file (e.g., a VHD) on a file system 141 of the virtualization layer 100. The virtualization layer 100 loads the identified virtual machine image 140. The started virtual machine 114 mounts and reads the virtual machine image 140, perhaps seeking a master boot record or other boot information, and boots a guest operating system which begins executing.

The virtualization layer 100 manages execution of the virtual machine 114, handling certain calls to the guest's kernel, hypercalls, etc., and coordinating the virtual machine 114's access to the underlying hardware 104. As the guest and its software run, the virtualization layer 100 may maintain state of the guest on the virtual disk image 140; when the guest, or an application run by the guest, writes data to "disk", the virtualization layer 100 translates the data to the format of the virtual disk image 140 and writes to the image.

The virtualization layer 100 may perform a process 144 for shutting down the virtual machine 114. When an instruction is received to stop the virtual machine 114, the state of the virtual machine 114 and its guest is saved to the virtual disk image 140, and the executing virtual machine 114 process (or partition) is deleted. A specification of the virtual machine 114 may remain for a later restart of the virtual machine 114.

Live Block Substitution

Figure 3:
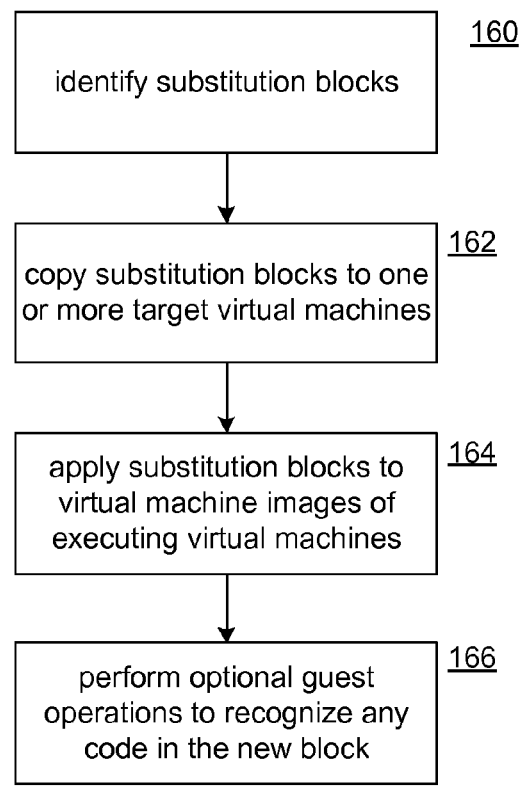
FIG. 3 shows a process for substituting blocks into an executing virtual machine.

FIG. 3 shows a process for substituting blocks into an executing virtual machine. At step 160 substitution blocks are identified. This may be accomplished in a number of ways. In one embodiment, a patch is applied to a first virtual machine image (e.g., a golden image). The patch may be applied by mounting the first virtual machine image as a file system and modifying files or other guest data stored in the virtual machine image. The patch may be applied by booting the virtual machine image in a virtual machine and executing a patching process (e.g., a Microsoft Installer™ file) to update an operating system or software installed thereon, including modifying a binary machine executable file. One or more blocks in the second (patched) virtual machine image may be identified by comparing the first and second virtual machine images block by block. If only a few select files containing binary machine executable instructions have been updated, it may be possible to identify the tainted block(s) (blocks containing the modified code) directly during the patching process. For example, a same block in the first and second virtual machine image (e.g. block N) may contain an original and updated file, respectively. By whatever means, it is assumed that at least one tainted block is identified in the second virtual machine image.

At step 162, the substitution blocks are copied to one or more target virtual machines. The substitution blocks may or may not be accompanied by a list identifying the substitution blocks. In one embodiment, the substitution blocks may be in the form of a difference disk or delta disk, details of which are known and described elsewhere. In another embodiment, the virtual machine images may be dynamic virtual disks that expand in size as needed.

At step 164 the blocks are applied at the hosts at which they are received. The substitution blocks are handled at the virtualization layer, which applies the substitution blocks to the virtual machine images thereon. For discussion, consider only a single host and a single substitution block. The host has a virtualization layer that manages execution of a virtual machine using a virtual machine image. The virtualization layer has a block-level driver that virtualizes access to the virtual machine image, providing block-level access to the image and causing the virtual machine image file to appear as a disk to the virtual machine. As such, the virtualization layer is able to transparently alter that "disk" without the need for awareness or cooperation of the virtual machine or the guest software executing in the virtual machine (although embodiments involving same are described later). The virtualization layer (or hypervisor) identifies a block in the target virtual machine image that will be replaced by the substitution block, possibly using a tainted block list received with the substitution block, or by comparing the substitution block with blocks in the target virtual machine image. The identified tainted block is then replaced with the substitution block, which becomes available to the still-executing associated virtual machine and guest software.

At step 166, operations below the virtualization layer may be performed. Note that in a case where the substitution block is known or assumed to contain read-only data, the substitution block may be copied directly and any substituted-in files may be simply used when they are accessed by the guest operating system. In another embodiment, the virtualization layer informs the guest operating system by a signal or message, possibly passed through a virtual machine bus or the like. For example, the hypervisor may send the virtual machine information about files in the substitute block that have been modified (possibly files with binary executable code). Or, by informing the operating system about the storage area of the block, and leaving it to the operating system to take any action, such as scanning the file system at file system locations corresponding to the block. In one embodiment, substitution blocks may contain customization information, which is specialized information to target or facilitation substitution. For example, a substation block may contain the name of the machine or may specify various machine configuration settings. When substitution occurs, the customization information is used to update a setting or state of the guest that is persisted in the corresponding virtual machine image. In this case, the substitution system has built-in understanding of the guest operating system, in contrast to embodiments where substitution is performed at the virtual hardware layer without regard for the guest operating system.

In one embodiment, the guest operating system may have a component such as a kernel module that responds to a signal from the hypervisor by taking various steps to assure that a file in the substitute block becomes available when the substitution block is copied into the virtual machine image. This may involve the guest operating system invalidating any paged-in executable code from the original (replace) block that is now out-of-date, invalidating or marking invalid any relevant file cache, and so forth. The guest operating system might also force a page fault to cause the file to be reloaded into memory (thus allowing for execution of code in the substitute block). The guest operating system may access a translation lookaside buffer to identify where the old code of a new file is located in physical memory, and update accordingly.

Figure 4:
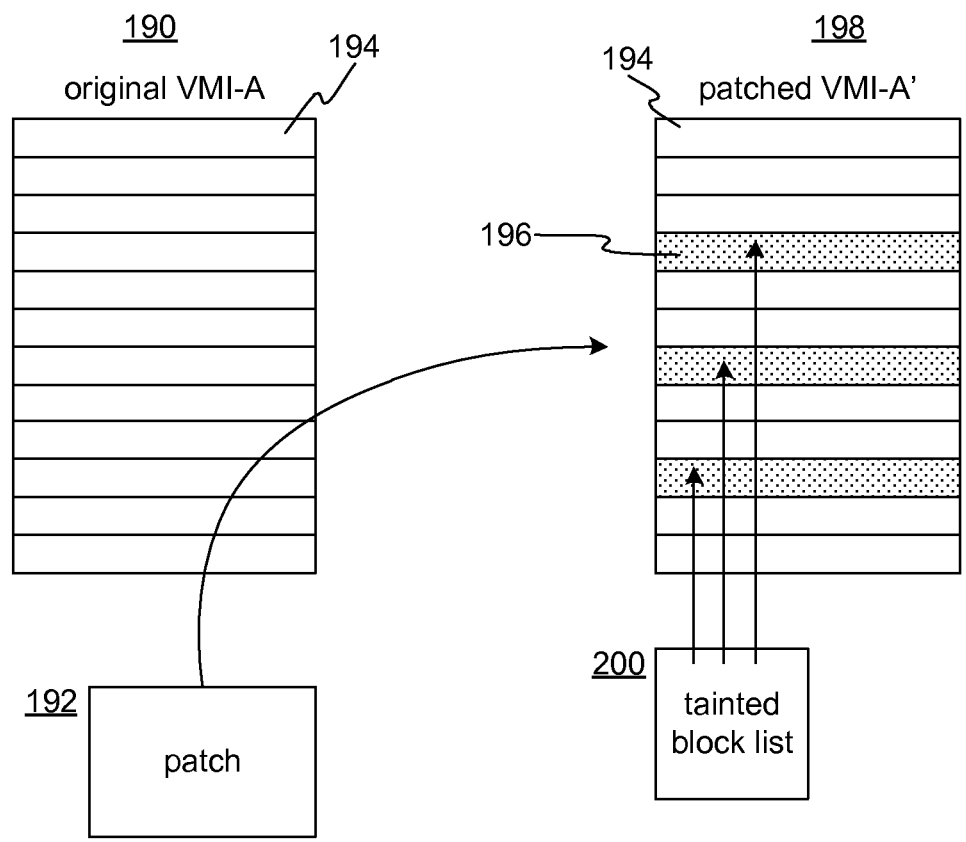
FIG. 4 shows a virtual machine image being patched.

FIG. 4 shows a virtual machine image being patched. An original virtual machine image 190, such as a golden image, is to be patched. A patch 192 is applied to the original virtual machine image (VMI-A). As noted above, this may involve mounting the original virtual machine image 190 (e.g., with an administrative tool), or booting the original virtual machine image 190 in a virtual machine. The patch 192 is then applied, which may update files, registry settings, virtualization settings, executables (libraries, programs, etc.), and other known patchable objects. A number of original blocks 194 may be affected. Modified blocks 196 in the patched virtual machine image 198 (VMI-A') are indicated by shading in FIG. 4. In one embodiment, a patch tool, virtual machine image tool (configured to read the format of the virtual machine images), or the like compares the original virtual machine image 190 and the patched virtual machine image 198 (e.g., by comparing block hashes, disk differencing, ec.). In another embodiment, blocks are tracked as they are updated and a list 200 of tainted blocks is thus accumulated. The substitute blocks 196 are then transmitted via a network to hosts where they will be applied.

Figure 5:
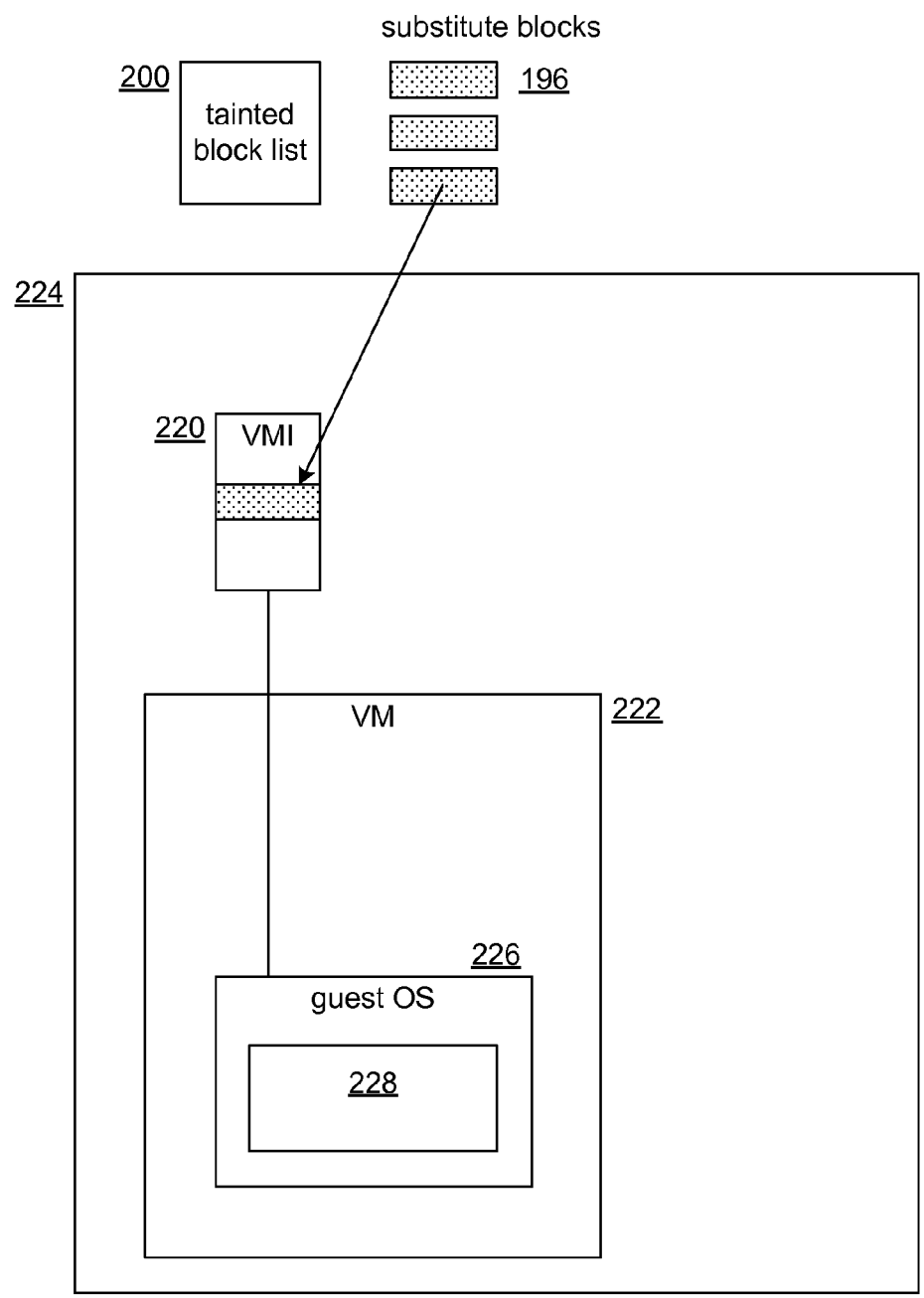
FIG. 5 shows substitute or modified blocks being applied to a target virtual machine image of an executing virtual machine.

FIG. 5 shows substitute or modified blocks 196 being applied to a target virtual machine image 220 of an executing virtual machine 222. A host 224 is hosting a hypervisor that runs the virtual machine 222 and manages access to the virtual machine image 220. The modified blocks 196 are received at the host 224 from a data center's virtual machine management software, for example. As the virtual machine 222 is executing, the modified blocks 196 are copied into the virtual machine image 220. In one embodiment, the tainted block list 200 is used to substitute in the modified blocks 196 for corresponding pre-existing outdated blocks. In another embodiment, if disk-differencing is used, the modified blocks 196 are effectively copied in by placing them in a difference-disk without explicitly overwriting old blocks. As the guest operating system 226 executes, it may implicitly or explicitly begin to access data, including possibly executable code, in the modified blocks 196. For example, an executable file 228 in a modified block 196 begins executing in the guest operating system 226 without restarting the guest operating system 226 or the virtual machine 222.

Figure 6:
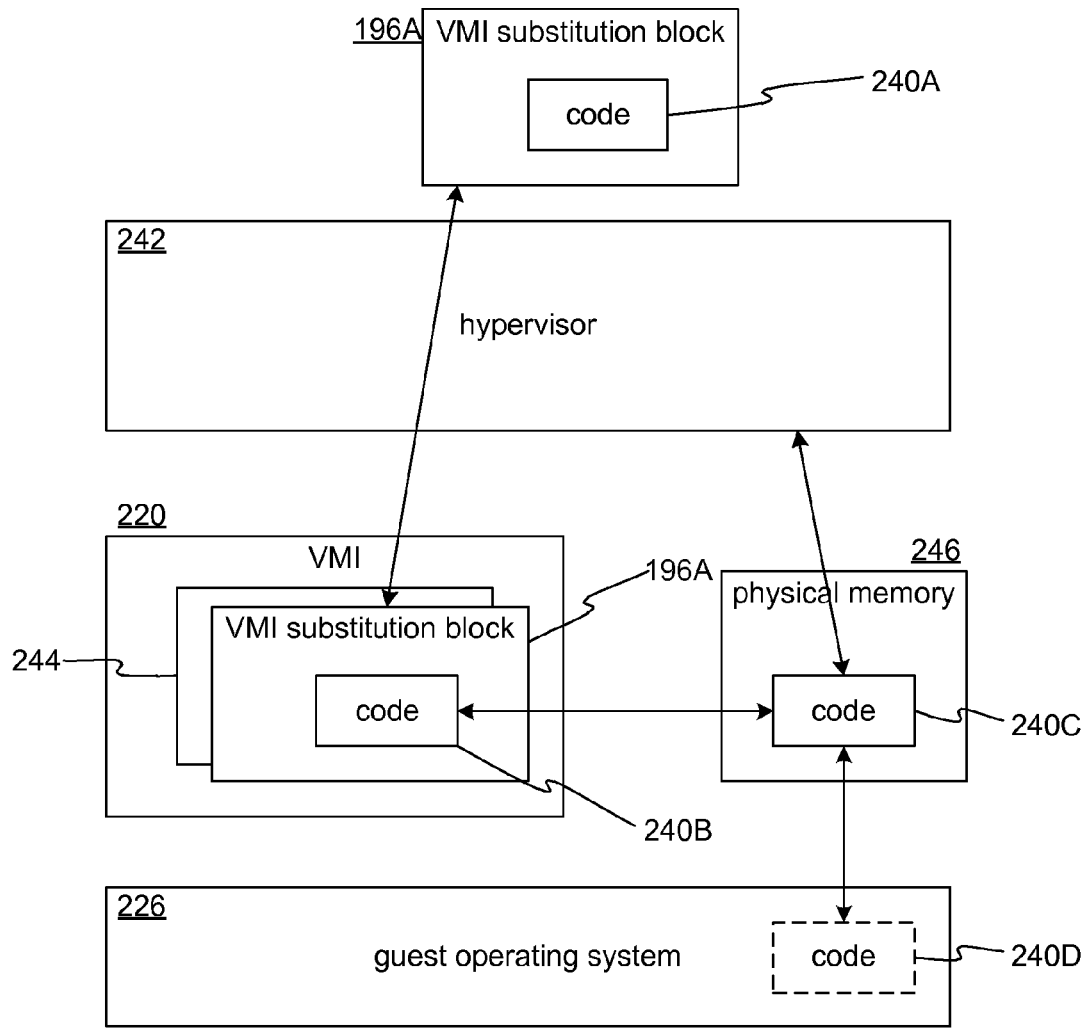
FIG. 6 shows a detailed view of physical memory and storage when a substitute block is loaded.

FIG. 6 shows a detailed view of physical memory and storage when a substitute block is loaded. A substitution block 196A may contain a portion of executable code 240A, for instance machine instructions for a processor of the relevant host. The executable code 240A originated from the patch 192. In some cases, it might be that the substitution block 196A is small and contains only patched/new executable code. In other cases, the substitution block 196A may contain some files or other data that has not changed (i.e., a file that was not changed by the patch 192). The hypervisor 242 updates the target virtual machine image 220 with the substitution block 196A, which replaces a previous block 244. The code 240A becomes available within the target virtual machine image 220 as code 240B (now a part of the virtual machine image 220 of the executing virtual machine 222).

In response to the insertion of the new substitution block 196A, or with some latency (for instance, when needed by the guest operating system 226), the code 240B is accessed by the guest operating system 226. At this time, the code 240B is paged into physical memory 246 by the virtualization layer, forming in-memory code 240C. The in-memory code 240C backs code 240D mapped in the virtual memory address space of the guest operating system 226.

It will be appreciated that any of the involved components may be modified or augmented to force out old code and force in new code. For example, the guest operating system 226 may be "enlightened" (provided with a virtualization-aware element) that flushes any affected caches, forces relevant pages to be faulted (and therefore re-read, thus loading code 240B into physical memory 246 as code 240C), etc. In another embodiment, the virtualization layer itself might directly update the physical memory of the guest operating system 226 with new code, possibly by scanning physical memory 246 to recognize the old code to be replaced. For instance, an appropriately enlightened operating system may float up to the hypervisor information about the relevant files and or memory. It is important to recognize that when the substitution block 196A is added the virtual machine may have an execution state that is inconsistent with the virtual machine image 220; code may still reside in memory that has been replaced by the substitution block 196A. A number of approaches are discussed below to address this possibility.

One approach for dealing with substituted-in code replacing code that has already been executed is to keep a pedigree for every memory-paged file. That is, the hypervisor tracks which disk block each file came from. With this approach, page table entries are invalidated, and the file cache may need to be cleared. In another embodiment, a page is taken, a page fault is forced, the page tables is searched, and the appropriate pages are faulted in, and the page tables are updated (possibly using a hook in the hypervisor). Another approach may involve the hypervisor passing to the guest a list of updated (invalid files), which the guest uses to refresh accordingly. In another embodiment, a file-to-block mapping is used to identify updated files, with appropriate memory fixes then performed.

To elaborate, consider that hypervisors typically provide a block device layer, and the guest operating system a file system layer. If the guest executes a binary file, then certain sections are mapped to physical pages; there is a page layer, which is backed by files (sometimes a swap file), backed by or directly mapped onto blocks. A file such as the text section of a binary file, may be loaded to a page.

While updates to a executing virtual machine have been mentioned, another embodiment may pause or suspend a virtual machine when a new block is substituted in. Although it may be convenient to use blocks that match a block-size used by the hypervisor performing the substitution, this is not required; smaller or larger blocks may be used. Moreover, although it may in some cases be desirable to avoid restarting virtual machines and guest operating systems, such may still be performed after a live block substitution, for example to resolve errors or to handle irreconcilable memory-disk issues.

Without limiting the embodiments, it should be noted that the live-patching technique discussed above may be used without regard for the underlying operating system. In addition, patching may be performed outside the ordinary mechanisms of virtual machine control and ownership. Specifically, a cloud hoster or data center operator can apply a patch to virtual machines without requiring guest or virtual machine credentials, which may be convenient for updating cloud fabric code that is embedded in a virtual machine. Furthermore, it may be possible to update software on a virtual machine without having to restart the virtual machine or the guest operating system. Some embodiments may be more readily implemented when update blocks contain read-only files.

CONCLUSION

Embodiments and features discussed above can be realized in the form of information stored in volatile or non-volatile computer or device readable media. This is deemed to include at least media such as optical storage (e.g., compact-disk read-only memory (CD-ROM)), magnetic media, flash read-only memory (ROM), or any current or future means of storing digital information. The stored information can be in the form of machine executable instructions (e.g., compiled executable binary code), source code, bytecode, or any other information that can be used to enable or configure computing devices to perform the various embodiments discussed above. This is also deemed to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A computer-implemented method of updating a virtual machine, the method comprising:

executing a hypervisor on a host computer, the hypervisor managing execution of the virtual machine on the host computer, wherein a guest operating system is currently executing on the virtual machine, the hypervisor providing the virtual machine with block-based access to a virtual machine image, the virtual machine image comprised of blocks;

receiving a substitution block at the host computer; and while the virtual machine is executing, replacing, by the hypervisor, a target block in the virtual machine image with the substitution block, the target block comprising one of the blocks of the virtual machine image, the hypervisor managing the blocks of the virtual machine image and presenting the blocks of the virtual machine image, including the substitution block, to the virtual machine as a virtualized disk.

2. A method according to claim 1, further comprising receiving a list of tainted blocks, and using the list of tainted blocks to identify the target block.

3. A method according to claim 1, wherein the substitution block was obtained from a base virtual machine image to which a patch was applied, and wherein the virtual machine image was derived from the base virtual machine image before the patch was applied.

4. A method according to claim 1, wherein the target block contains a first version of a portion of a binary machine code file executable by the guest operating system, the substitute block comprises a second version of the binary machine code file, and when the substitute block replaces the target lock in the virtual machine image, the second version of the binary machine executable file is available for execution by the guest operating system.

5. A method according to claim 4, wherein the first version of the binary machine code file is being executed in the virtual machine when substitute block replaces the target block, and the method further comprises forcing the guest operating system to load the second version of the binary machine code file.

6. A method according to claim 5, wherein the forcing the guest operating system is performed by using information relating the first version of the binary machine code file with a portion of physical and/or virtual memory.

7. A method according to claim 5, the method further comprising forcing a page fault in the guest operating system that corresponds to the first version of the binary machine code file.

8. One or more computer-readable storage devices storing information to enable a computer to perform a process, the process performed by a virtualization layer executing on the computer, the process comprising:

executing the virtualization layer on the computer, the virtualization layer managing execution of a virtual machine on the computer, wherein a guest operating system is executing on the virtual machine, the virtualization providing the virtual machine with block-based access to a first virtual machine image, the first virtual machine image comprised of first blocks that the virtualization layer presents as a virtualized disk;

while the virtual machine is being executed with the first virtual machine image on the computer by the virtualization layer that manages virtual machines on the computer, receiving a second block obtained from a second virtual machine image; and while the virtual machine continues to be executed, replacing one of the first blocks with the second block.

9. One or more computer-readable storage devices according to claim 8, wherein the second block contains customization information and when the second block replaces the one of the first blocks, a setting or state of a guest operating system of the virtual machine is updated according to the customization information.

10. One or more computer-readable storage devices according to claim 9, wherein the replacing is performed such that the process is specific to the guest operating system.

11. One or more computer-readable storage devices according to claim 8, wherein a guest operating system is executing in the virtual machine and the virtual machine has physical memory of the computer that is managed by the virtualization layer, and prior to the replacing, the physical memory contains first binary executable code from the first block, the process further comprising: after the replacing of the first block with the second block, functionally removing the first binary executable code from the physical memory and loading into the physical memory second executable code in the first block within the first virtual machine image.

12. One or more computer-readable storage devices according to claim 8, further comprising receiving a tainted block list and identifying the first block, among the plurality of first blocks, according to the tainted block list.

13. One or more computer-readable storage devices according to claim 8, the process further comprising a guest operating system in the virtual machine, the guest operating system having a component to communicate with the virtualization layer, the process further comprising the virtualization layer communicating with the component to cause the guest operating system to page into memory a portion of the second block, the portion being obtained from the first virtual machine image by the virtualization layer.

14. A method performed by one or more computers, the method comprising:

applying a patch to a first virtual machine image to generate a second virtual machine image;

identifying blocks of the second virtual machine image that differ from the first virtual machine image;

distributing the identified blocks to a plurality of hosts, each host having a hypervisor and one or more virtual machines managed thereby, each virtual machine having a virtual machine image comprised of blocks and presented as a virtual disk by the corresponding hypervisor; and applying the blocks to the virtual machines as they are running on the hosts, the applying performed by respective hypervisors replacing blocks of the virtual machine images managed by the hypervisors.

15. A method according to claim 14, wherein one of the hosts makes the blocks available to a virtual machine running thereon while the virtual machine continues executing on the host.

16. A method according to claim 15, further comprising restarting a guest operating system of a virtual machine on one of the host to cause the guest operating system to have content of one of the identified blocks available for execution.

17. A method according to claim 15, further comprising using a file-to-block mapping on one of the hosts to identify a file in a block at the host.

18. A method according to claim 17, further comprising forcing a page fault to force executable code in one of the blocks into memory of a guest operating system executing in a virtual machine on one of the hosts.

19. A method according to claim 15, wherein the blocks comprise read-only content.

20. A method according to claim 15, wherein a hypervisor at one of the hosts comprises a block-based device driver that handles access to virtual machine images of virtual machines on the host by mapping blocks of the virtual machine images to virtual disks of the virtual machines.

\* \* \* \* \*